(12) United States Patent
Delpero et al.

(10) Patent No.: US 11,633,944 B2
(45) Date of Patent: Apr. 25, 2023

(54) ACOUSTIC FIBROUS DECOUPLER

(71) Applicant: Autoneum Management AG, Winterthur (CH)

(72) Inventors: Tommaso Delpero, Zürich (CH); Laura Gottardo, Winterthur (CH); Delphine Guigner, Winterthur (CH); Grégory Winiger, Winterthur (CH)

(73) Assignee: Autoneum Management AQ, Winterthur (CH)

( * ) Notice: Subject to any disclaimer, the term of this patent is extended or adjusted under 35 U.S.C. 154(b) by 324 days.

(21) Appl. No.: 16/628,671

(22) PCT Filed: Jun. 14, 2018

(86) PCT No.: PCT/EP2018/065836
§ 371 (c)(1),
(2) Date: Jan. 5, 2020

(87) PCT Pub. No.: WO2019/007660
PCT Pub. Date: Jan. 10, 2019

(65) Prior Publication Data
US 2020/0122651 A1   Apr. 23, 2020

(30) Foreign Application Priority Data
Jul. 7, 2017 (EP) .................................. 17180312

(51) Int. Cl.
*B32B 27/12* (2006.01)
*B32B 3/26* (2006.01)
(Continued)

(52) U.S. Cl.
CPC ............. *B32B 27/12* (2013.01); *B29C 70/30* (2013.01); *B32B 3/263* (2013.01); *B32B 5/022* (2013.01);
(Continued)

(58) Field of Classification Search
CPC ..... B60R 13/0815; B32B 3/263; B32B 5/022; B32B 5/142; B32B 27/12;
(Continued)

(56) References Cited

U.S. PATENT DOCUMENTS 7,322,440 B2 * 1/2008 Khan .................... B32B 27/065
181/284

FOREIGN PATENT DOCUMENTS

| EP | 2364881 A1 | 9/2011 |
| EP | 3015314 A1 | 5/2016 |
| WO | 2016066640 A1 | 5/2016 |

OTHER PUBLICATIONS

European Search Report from related EP17180312. dated Jan. 5, 2018. 3 pages.
(Continued)

*Primary Examiner* — Joanna Pleszczynska
(74) *Attorney, Agent, or Firm* — FisherBroyles, LLP; Craig W. Mueller

(57) ABSTRACT

Moulded three-dimensional noise attenuating trim part for a vehicle, comprising at least a three layer system consisting of a first porous fibrous layer and a second porous fibrous layer and an air permeable intermediate film layer situated between the first and second porous fibrous layers and wherein the adjacent surfaces within the three layer system are interconnected, wherein the second porous fibrous layer has an area weight AW2 that is varying over the surface and wherein at least for areas of the three layer system with a total thickness t between 5 and 35 mm, the area weight AW2 relates to the total thickness t of the three layer system as following $25*t+175 < AW2 < 45*t+475$ wherein t is in mm and AW2 is in $g \cdot m-2$ and wherein the area weight AW2 of the second porous fibrous layer is increasing with increasing total thickness t of the three layer system.

15 Claims, 3 Drawing Sheets

(51) Int. Cl.
    *B32B 5/02*         (2006.01)
    *B32B 5/14*         (2006.01)
    *B60R 13/08*       (2006.01)
    *G10K 11/168*     (2006.01)
    *B29C 70/30*       (2006.01)
    *B29K 101/12*     (2006.01)
    *B29L 31/30*       (2006.01)

(52) U.S. Cl.
    CPC .......... *B32B 5/142* (2013.01); *B60R 13/0815* (2013.01); *G10K 11/168* (2013.01); *B29K 2101/12* (2013.01); *B29L 2031/3005* (2013.01); *B32B 2307/102* (2013.01); *B32B 2307/718* (2013.01); *B32B 2307/72* (2013.01); *B32B 2307/724* (2013.01); *B32B 2605/003* (2013.01)

(58) Field of Classification Search
    CPC ........ B32B 2307/718; B32B 2307/102; B32B 2307/72; B32B 2605/003; B32B 2307/724; G10K 11/168
    See application file for complete search history.

(56) References Cited

OTHER PUBLICATIONS

International Search Report from related PCT/EP2018/065836. dated Jul. 25, 2018. 4 pages.
Written Opinion from related PCT/EP2018/065836. dated Jan. 10, 2019. 5 pages.

\* cited by examiner

ACOUSTIC FIBROUS DECOUPLER

CROSS REFERENCE TO RELATED APPLICATIONS

This application is a national stage application under 35 U.S.C. 371 and claims the benefit of PCT Application No. PCT/EP2018/065836 having an international filing date of Jun. 14, 2018, which designated the United States, which PCT application claimed the benefit of European Patent Application No. 17180312.5, filed Jul. 7, 2017, the disclosure of each of which are incorporated herein by reference.

TECHNICAL FIELD

The present invention is directed to an automotive interior trim part, such as inner dash insulators and floor carpets, for noise attenuation in vehicles, in particular in cars.

BACKGROUND ART

There are many sources of noise in a vehicle such as noise from power train, tire noise, brake noise and wind noise. The noise generated by these different sources enters into the vehicle's passenger compartment and may cover a rather wide frequency range.

For noise attenuation in vehicles, particularly in cars and trucks, the use of trim parts such as insulators and absorbers to reflect and dissipate noise and thus reduce the overall interior noise level is well known.

Noise attenuating trim parts, here also referred to as trim parts, such as inner dash insulators and floor carpet systems, are moulded into a three dimensional shape in order to follow the shape of the vehicles body when installed in the vehicle. The three dimensional shape of the trim part may be very strong and the thickness of the trim part may vary from a few millimetres up to about 100 millimetres.

In addition to acoustic performance requirements these trim parts should also provide certain overall rigidity in order to make it easier to handle the part for example during installation as well as local rigidity such as tread strength, for instance not being too soft and spring back too much when pressing on the trim part for example when standing on the trim part while stepping in or out of the vehicle.

These trim parts may comprise foam and or textiles felt layers and are often made of a decoupling layer facing the vehicle body and at least a top layer facing away from the vehicle body.

Normally these trim parts are produced by placing pre produced felt layers with uniform area weight in a mould and during compression creating the shape of the trim part.

The pre produced felt layers, so called blanks, have more or less uniform area weight and thickness over the surface. At least after compression to form the part the density of the layers varies over the surface of the trim part. For acoustic and weight saving reasons, a very low area weight of at least the decoupling layer may be selected. On the other hand in order to provide enough stiffness and tread strength, especially in some thicker areas of the trim part, a higher area weight of at least the decoupling layer may be necessary. Selecting a layer with a higher and uniform area weight may impair the acoustic performance in some thinner areas of the trim part where the high area weight is not needed and is then too high for acceptable acoustic performance.

The use of felt layers according to the state of the art has also other drawbacks. In particular the felt tends to reduce in its thickness during use of the trim part and or especially during the production process where in addition the fibers used. The noise attenuation of a trim part comprising such fibrous layer, also together with a film, is therefore degraded.

It is therefore the object of the current invention to further optimise fibrous noise attenuating trim part products of the state of the art and in particular to further optimise the overall acoustic performance of the part.

SUMMARY OF INVENTION

The object of the invention is achieved by a moulded three-dimensional noise attenuating trim part for a vehicle according to claim 1, the moulded three-dimensional noise attenuating trim comprising at least a three layer system consisting of a first porous fibrous layer and a second porous fibrous layer and an air permeable intermediate film layer situated between the first and second porous fibrous layers and wherein the adjacent surfaces within the three layer system are interconnected, wherein the second porous fibrous layer has an area weight AW2 that is varying over the surface and wherein at least for areas of the three layer system with a total thickness t between 5 and 35 mm, the area weight AW2 relates to the total thickness t of the three layer system as following $25*t+175 < AW2 < 45*t+475$ wherein t is in mm and AW2 is in $g \cdot m^{-2}$ and wherein the area weight AW2 of the second porous fibrous layer is increasing with increasing total thickness t of the three layer system.

The adjacent surfaces of the three layers are interconnected with the adjacent surfaces of the layers being engaged substantially over the entire surface.

The second porous fibrous layer has an area weight AW2 that is varying over the surface and should be understood as varying over the surface outside the normal production variation which is about +/−10%.

The second porous fibrous layer, here also referred to as second layer, may have substantially constant density at varying thickness. Constant density or constant area weight should be understood as constant within normal production variation.

Preferably the second porous fibrous layer is a decoupling layer, also referred to as decoupler, facing the body of the vehicle when mounted in the vehicle. The first porous fibrous layer is preferably a top layer of the three layer system facing away from the vehicle body. The air permeable intermediate film layer being situated between the first and second porous fibrous layers.

However other further layers may be situated on top of the first porous fibrous layer (top layer), such as covering scrim layer, acoustic scrim layer, decorative top layer, for instance a tufted carpet or nonwoven carpet.

The three layer system is air permeable and there are no other layers positioned in-between the first porous fibrous layer and the air permeable film layer, or between the second porous fibrous layer and the air permeable film layer.

The trim part or the three layer system as such is three-dimensional in the sense of having a shape suitable for following the shape of the vehicle body when installed in the vehicle. The thickness of the trim part and the three layer system may vary strongly over the surface.

The expression "over the surface" should be understood throughout as over the main surface of respective layer and or of the three layer system.

Surprisingly, the noise attenuating performance of a trim part, e.g. a carpet system for a vehicle may be improved by using the 3 layer system according to the invention in particularly by a combination of a first fibrous layer, an air permeable film layer and second porous fibrous layer (decoupler layer) wherein the area weight of the second fibrous layer is optimised in relation to the total thickness of the full 3-layer system according to the invention. With lower area weight for the second fibrous layer in areas of the trim part with lower overall thickness and higher area weights for the second fibrous layer in areas with higher overall thickness. Furthermore the tread strength can be improved by optimising the area weight of the second layer in certain areas with higher thickness. Surprisingly this increases the acoustic performance independent from the area weight of the first fibrous layer, however this layer may have an effect on the overall acoustic performance in addition to the effects claimed.

Too low area weight of the second porous layer may impair the stiffness of the trim part and may also below a certain area weight not further substantially contributing to a better noise attenuation. Too high area weight of the second porous layer may reduce the noise attenuating performance and is also unnecessarily increasing the weight of the trim part.

By applying the upper limit 45*t+475 and the lower limit 25*t+175 for the area weight AW2 of the second porous fibrous layer (wherein t is in mm and AW2 is in $g \cdot m^{-2}$) according to the invention for areas with total thickness of the three layer system between 5 and 35 mm, a too low and or too high area weight may be avoided and a noise attenuation trim part according to the invention with a good noise attenuation performance can be achieved compared to trim parts with a second porous fibrous layer (decoupling layer) having an area weight outside these limits with similar weight.

These area weight-thickness relations are guiding the skilled person to find the right area weight, allowing designing a trim part with a balanced compromise between noise attenuation performance and compression stiffness. The lower area weight limit is, besides ensuring certain minimum compression stiffness, also indicating a minimum amount of material suitable for better filling the very thick areas of the decoupler.

By using a second fibrous layer with an area weight within the upper and lower limit of the AW2 according to the invention, especially a too high area weight in thin areas may be avoided as well as too high and low area weights in thicker areas may be avoided.

If a certain minimum compression stiffness of the second layer is required, the compression stiffness should be checked, for example by measurements according to the current ASTM D3574-05 Test C with modification as described below, and if too low the area weight in that region can be increased in order to increase the compression stiffness. However the increased area weight should not be outside the area weight-thickness relations according to the invention.

The steps may be to first ensure that the AW2 of the second porous fibrous layer is within the upper and lower limits according to the invention and then check the compression stiffness. If needed, increase the area weight in the required areas and recheck the compression stiffness and that the area weight is within the upper and lower limits according to the invention. These steps can be repeated if needed.

By applying the area weight-thickness relations when designing the trim part, the weight of the trim part may be reduced with same acoustic performance or increased acoustic performance for the same weight compared to the trim parts according to the state of the art.

The area weight of the second porous fibrous layer may be calculated for a local area of the three layer system, where the total thickness t of the three layer system is measured. The local area of the three layer system is cut perpendicularly to the direction of the layers, to obtain a portion of the three layer system. The first porous fibrous layer and the intermediate air permeable film layer may be removed from the second layer and the area weight of the second layer alone can be estimated. The calculation of the area weight of a local area can be repeated for different areas of the three layer system.

Each of the first and second fibrous layers has preferably an area weight between 300 and 4000 $g \cdot m^{-2}$, preferably between 300 and 3000 $g \cdot m^{-2}$, preferably between 300 and 2050 $g \cdot m^{-2}$.

In general by increasing the weight of the first layer the noise attenuation can be improved but at the cost of a heavier trim part. However by optimising the second porous fibrous layer (decoupling layer) according to the invention the noise attenuation can be further improved or the weight of the top layer may be reduced at same acoustic performance.

Preferably the second layer is less compressed and or thicker compared to the first layer and wherein the second porous fibrous layer closely follow the shape of the vehicle body. A thinner more compressed first layer increases the airflow resistance of the three layer system and of the trim part.

Preferably the thickness of the second layer is 30 to 95%, preferably 50 to 90% of the total thickness of the three layer system and wherein the thickness of the first layer is between 1 and 15 mm, preferably between 2 and 10 mm.

The stiffness of the noise attenuating trim part depends not only on the stiffness of the individual layers but also on the number of layers in the region where the stiffness is estimated. However an important feature for the overall stiffness of the trim part is the compression stiffness of the second porous fibrous layer.

Preferably at least the second porous fibrous layer has a compression stiffness of at least 3.5 kPa, preferably between 5 and 25 kPa, measured according to the current ASTM D3574-05 Test C with the following modifications. ASTM D3574-05 Test C is directed to foam materials but is normally used within the automotive industry also for porous fibrous materials, for lack of suitable test method for porous fibrous materials.

The size and thickness of the samples also differ to the ASTM D3574-05 Test C standard and smaller and thinner sample sizes have been used. Measurements have been done on disc samples with a diameter of 60 mm and thicknesses down to 5 mm.

For noise attenuation of trim parts the air flow resistance (AFR) of the individual layers as well as the overall airflow resistance of the three layer system and of the trim part may be further optimised.

In order to have a high performing noise attenuating trim part, the AFR of the trim part should preferably not be too high in order to not reflect most of the noise, but should also preferably also not be too low since the layer and part may then not absorb enough noise.

Preferably the total air flow resistance of the three layer system is between 500 and 10000 $Ns \cdot m^{-3}$, preferably between 1000 and 7000 $Ns \cdot m^{-3}$, preferably between 2000 and 6000 $Ns \cdot m^{-3}$, measured according to current ISO 9053, using the direct airflow method (method A).

The current ISO 9053, using the direct airflow method (method A) is used for all AFR values disclosed.

Preferably at least for areas of the three layer system with a total thickness t between 5 and 35 mm, the overall air flow resistance and the overall density $\bar{\varrho}$ of the three layer system relate as following $$1500 < AFR_{overall} - 10\,\bar{\varrho} < 5000 \text{ with } AFR_{overall} \text{ in Nsm}^{-3} \text{ and } \bar{\varrho} \text{ in kg/m}^3.$$

Preferably at least for areas of the three layer system with overall density above 160 kg/m³, the overall air flow resistance and the overall density g of the three layer system relate as following $$1500 < AFR_{overall} - 10\,\bar{\varrho} < 5000 \text{ with } AFR_{overall} \text{ in Nsm}^{-3} \text{ and } \bar{\varrho} \text{ in kg/m}^3.$$

The relations of $AFR_{overall} = 10*\bar{\varrho} + 1500$ and $AFR_{overall} = 10*\bar{\varrho} + 5000$ represent respectively the minimum and the maximum optimal value of the overall AFR as function of the overall density. The optimal overall AFR for three-dimensional (3D) trim parts is between these two boundaries.

The noise attenuating trim part according to the invention remains open also for layers with high densities, thus ensuring an optimal acoustic performance.

The overall density $\bar{\varrho}$ in kg/m³ of a certain portion of the part is defined as the overall mass in that portion divided by the overall volume in the same portion, wherein the overall mass is the mass of the three layers (of the three layer system) combined and the overall volume is the volume of the three layers combined.

The overall density is calculated for the local area of the part, where the overall air flow resistance is measured. The local area of the part is cut perpendicularly to the direction of the layers, to obtain a portion of the part, on which the overall area weigh and or density is measured.

The relation between the density and the air flow resistance as defined and claimed is area related and therefore mixing of different locations would result in an incorrect dataset.

The overall air flow resistance (AFR) is the AFR as measured on the local area of the trim part. It is clear to a skilled person that an average over a certain small area will do as well to follow the teachings of the invention as disclosed, as the measurement for density and AFR are done on an area rather than at the level of a single point. The AFR is measured according to ISO 9053, using the direct airflow method (method A).

Due to the typical shape of the parts and to the materials used, both the overall density and the overall AFR are variable over the part's surface. In order to define the minimum area to measure those quantities, the ISO 9053 defines a minimal circular area having a diameter of 95 mm that must be used. However as the 3D shape of the parts is particularly marked in some cases, when necessary the skilled person can deviate from the limit of the norm and measure samples with a smaller circular area having a diameter of not less than 75 mm, provided that the tool for the measurement of the AFR is adapted to provide a proper airflow through such local area of the part. For such a sample, it is advised that the thickness variation over the sample's surface is kept within a range of around 20%. For example it is acceptable to measure a sample having a thickness of 5 mm with local deviation between 4 and 6 mm (and not outside this range), or a sample having a thickness of 10 mm with local deviations of between 8 and 12 mm.

Due to impedance difference between the three layers of the three layer system, the noise attenuation and especially the noise absorption is improved.

Preferably the air flow resistance of the first porous fibrous layer and the intermediate film layer together represents at least 55%, preferably between 65% and 80% of the total AFR of the three layer system.

Preferably the AFR of the intermediate film layer is higher than the total AFR of the first and second porous fibrous layers.

The first and second porous fibrous layers comprise fibers and preferably thermoplastic binder material.

Preferably the first and second porous fibrous layers comprise fibers made of at least one material selected from the group consisting of polyamide (nylon) such as polyamide 6 or polyamide 66, polyester such as copolymers of polyester or polyethylene terephthalate (PET) or polybutylene terephthalate (PBT) or polytrimethylene terephthalate (PTT), polyolefin such as polypropylene or polyethylene such as copolymer of polyethylene and mineral fibers, preferably one of glass fibers or recycled glass fibers or basalt fibers or carbon fibers.

Preferably at least one of the first and second porous fibrous layer, preferably at least the second porous fibrous layer, comprise self-crimped frizzy fibers, preferably hollow self-crimped frizzy fibers.

Surprisingly the use of a combination of self-crimped frizzy fibers with a thermoplastic binder makes it possible to increase the thickness at a lower density, while maintaining or even improving the acoustic performance. This enables a better filling of the space available without the need to add additional weight to the part.

The self-crimped frizzy fiber is a side by side conjugate fiber also referred to as bicomponent fiber. The self-crimped frizzy fibers, also referred to as frizzy, curved or self-crimped fibers, are made for instance by two sides, of the conjugate fiber, and are arranged such that one side shrinks differently from the other side and thereby induces a permanent curved shaping of the fiber away from the straight line, for instance in the form of spiral, omega or helical. However in most cases the shape is not necessarily a regular structure but irregular 3-dimensionally shaped versions are having the same advantage.

Preferably the conjugate material is chosen such that there is a difference in viscosity causing an inherent curling or frizzing in the fibre. However other types of conjugate fibers that show a similar effect as defined might be chosen as well.

Surprisingly adding self-crimped frizzy fibers to a porous fibrous layer, enhances the evenness of the material layer obtained by for instance carding methods or more preferably fiber injection methods. The natural tendency of the self-crimped frizzy fibers to go back to a random curled form gives the fibers an additional resilience. For instance, open fibers are not forming clumps again during processing and are therefore better spread throughout the layer.

Surprisingly the material as claimed can be thermoformed more precisely in a 3-D shape and in addition the resilience of the material is not substantially reduced during curing or moulding, showing that the self-crimped frizzy fibers are less prone to deterioration during the curing or moulding process of the actual part. Furthermore the porous fibrous layer comprising self-crimped frizzy fibers keeps its resilience during use, therefore the initial thickness obtained directly after moulding is maintained longer.

Self-crimped frizzy fibers differ from mechanically crimped fibers because they obtain the crimping capacity during the spinning of the fiber as an intrinsic feature of the fiber. This intrinsic self-crimp of frizzy fibers is less likely to be lost during further production process steps or later use of the material. The crimp in self-crimped frizzy fibers is permanent.

The advantages of using a self-crimped frizzy fiber rather than a mechanically crimped fiber are manifold. For the invention as disclosed the most important advantages are that the fiber is in the crimped status from the beginning of the production of the fibrous layers. The crimped status in the form of a randomly 3-dimensional shaped fiber is the preferred status of the fiber. Surprisingly, the fiber stays in this preferred shape during the whole production as well as during the lifetime of the trim part. Mechanically crimp on its own is less strong and will lose its properties over time. Mechanical crimped fibers will flatten out over time, losing the resilience and loftiness, making the trim part fail over time in its purpose.

The self-crimped frizzy fibers may also be made of a combination of a polymer such as different polyester, for instance a combination of polyethylene terephthalate (PET) and polytrimethylene terephthalate (PTT).

Preferably the self-crimped frizzy fibres have an overall round cross section, more preferably with a hollow core, also known as hollow conjugate fibers. However, other cross-sections known in the art to make conjugate self-crimped frizzy fibers can be used as well.

The staple fibre length of frizzy fibers used is preferably between 32 and 76 mm, preferably 32 to 64 mm. The fiber is preferably between 2 and 28 dtex, preferably between 3 and 15 dtex, preferably between 3 and 10 dtex.

The binder material should have a lower melting point compared to the polymers which the self-crimped frizzy fibers are made of, hence only the binder is melting during the production and not the self-crimped frizzy fibers.

Surprisingly a preferred combination of cotton fibers and self-crimped frizzy fibers, bound together using binder fibers shows an increase in compressional stiffness, improving the overall performance. Due to the higher compressional stiffness the noise attenuating trim part will not reduce in its thickness during use.

Preferably at least one of the first and second porous fibrous layer comprise reclaimed fibers made of at least one material selected from the group consisting of cotton shoddy, synthetic shoddy, polyester shoddy, natural fiber shoddy and mixed synthetic fiber and natural fiber shoddy.

Reclaimed fibers are preferably produced from textile fabrics, preferably shoddy cotton, shoddy synthetic, shoddy polyester or shoddy natural fibers. The shoddy type is defined by having at least 51% by weight of the material included, 49% can be fibers from other sources. So for instance, shoddy polyester contains at least 51% by weight of polyester based materials. Alternatively, the shoddy material can be a mixture of different synthetic and natural fibers, whereby not one type is prevailing.

Any of the fibers, self-crimped frizzy fibers, binder fibers, reclaimed fibers, synthetic fibers, natural fibers or mineral fibers are staple fibers and may be made of virgin and or recycled material.

Preferably the first and second porous fibrous layer comprise thermoplastic binder material made of at least one of the materials selected from the group consisting of polyester such as polyethylene terephthalate, copolymers of polyester, polyolefin such as polypropylene or polyethylene, polylactic acid (PLA) and polyamide such as polyamide 6 or polyamide 66.

Preferably the binder material is in the form of fibers, flakes or powder. More preferably the binder material is one of a mono-component fiber or bi-component fiber.

In the case of a binder fiber, the length is preferably between 32 and 76 mm, preferably 32 to 64 mm. A binder fiber is preferably between 2 and 5 dtex.

In one embodiment according to the invention at least one of the first and second porous fibrous layers comprise filler fibers and self-crimped frizzy fibers and wherein at least one of the first and second porous fibrous layers substantially consists of 10 to 40% of thermoplastic binder material, 10 to 70% of filler fibers and 10 to 70% of self-crimped frizzy fibers and wherein the total amount adds to 100% by weight.

Filler fiber is to be understood as any fiber not being self-crimped frizzy fibers or binder material.

In another embodiment according to the invention at least one of the first and second porous fibrous layer comprise filler fibers and self-crimped frizzy fibers and wherein at least one of the first and second porous fibrous layer substantially consists of 10 to 40% of thermoplastic binder, 10 to 40% of filler fibers and 10 to 60% of self-crimped frizzy fibers and 10 to 50% shredded foam pieces and wherein the total amount adds to 100% by weight.

Preferably BICO fibers are used together with hollow conjugate self-crimped frizzy fiber and cotton shoddy. Preferably the BICO fiber is polyester/CoPET.

Preferably the shredded foam is polyurethane foam, preferably soft polyurethane foam. The density of the foam is preferably between 10 and 100 kg·m$^{-3}$, preferably between 20 and 90 kg·m$^{-3}$, preferably between 25 and 85 kg·m$^{-3}$. The size of the shredded foam pieces is preferably between 2 and 20 mm, preferably between 3 and 15 mm, preferably between 4 and 10 mm.

Preferably the air permeable intermediate film layer, here also referred to as film layer, comprises at least one layer comprising at least one of the polymers or copolymers selected from the group consisting of polyester such as polyethylene terephthalate (PET) or polybutylene terephthalate (PBT) or copolyester (CoPES), polyamide such as polyamide 6 or polyamide 66, polyolefin such as a polyethylene (PE) or low density polyethylene (LDPE) or linear low density polyethylene (LLDPE) or high density polyethylene (HDPE), ethylene acrylic acid copolymers (EAA), polypropylene (PP), thermoplastic elastomers (TPEs) such as thermoplastic polyolefin (TPO), thermoplastic polyurethane (TPU), polyetherimide, polysulfone, polyethersulfone, polyetheretherketone and copolymers such as ethylene vinyl acetate (EVA) or biopolymers such as polylactic acid.

The air permeable intermediate film layer may also be referred to as intermediate film layer, film layer or foil and should be understood to be a thin layer, preferably with a thickness of at least 15 micrometres, preferably between 15 and 100 micrometres, preferably between 15 and 50, preferably between 15 and 30 micrometres.

Preferably the area weight of the film layer is below 200 g·m$^{-2}$, preferably below 100 g·m$^{-2}$, Preferably a bilayer or multilayer film may be used wherein the film layer also may function as a binding layer laminating the first and the second porous fibrous layer together. Preferably the film layer is a three layer film with a core having a higher melting temperature compared to the outer layers. The outer layers are during production melting and bonding the core layer of the film to the first and second porous fibrous layers.

The air permeable film may be pre-perforated, for instance by needle perforation, and or made air permeable during the moulding of the three layer system for instance by the effect of hot steam and/or by needles integrated in the moulding process.

The air permeable film layer may be glue, powder, foil, film, coating etc., that stays a film layer or becomes a film type of layer during production of the noise attenuating part. The film layer may also soften and or melt during production and mix with the binder of the first and or second porous fibrous layers.

For any of the fibers or the film layer the polymers used can be virgin or based on recycled material, as long as the material requirements are fulfilled.

Preferably the three-dimensional noise attenuating trim part according to the invention further comprises at least a covering scrim layer, an acoustic scrim layer, a decorative top layer, for instance a tufted carpet or nonwoven carpet.

The moulded three-dimensional noise attenuating trim part, according to the invention, may be used as an interior trim part such as an inner-dash insulator and or as a floor carpet.

Preferably the moulded three-dimensional noise attenuating trim part, according to the invention is produced as described below.

Method for producing the moulded three-dimensional noise attenuating trim part according to the invention, comprising the steps of a) Preparing at least an unconsolidated or pre-consolidated second porous fibrous layer with an area weight varying over the surface, wherein the layer is produced by laying a mix of fibers and binder material into a product shaping cavity.

b) Preparing an unconsolidated or pre-consolidated first porous fibrous layer.

c) Stacking a film layer and the unconsolidated or pre-consolidated first and second fibrous layers in a mould with the film layer situated in-between the first and second porous fibrous layers. Optionally additional layers can be placed underneath and or on top of the three layers.

d) Consolidating the materials and laminating the layers together in the mould by a consolidating treatment, preferably hot air, steam or infrared heating, wherein the thermoplastic binder softens and or melts, binding the fibers together and or optionally binding to the adjacent layers.

The unconsolidated or pre consolidated second porous fibrous layer with area weight varying according to the invention, may for example be produced by using a machine disclosed in EP 2640881, where the fiber mixture including the binder is fed in a cavity in the form of the final product giving rise to a porous fibrous layer shape that contains the thickness variations necessary with a varying area weight over the surface of the layer. The density of the porous fibrous layer may be kept substantially constant throughout the filling process. This second porous fibrous layer can either be pre-consolidated directly on the machine as disclosed in the patent referenced or can be consolidated afterwards.

The first fibrous layer may be produced as a mat or blank using a method, such as carding cross lapping or air lay, known to the skilled person.

The term "consolidation" or "consolidated" should be understood to be the process, during production of the noise attenuating part and or of the individual layer, wherein the fibrous layer is heated and the thermoplastic binder softens and or melts, binding the fibers together and or optionally binding to the adjacent layers.

Pre-consolidation should be understood as where the consolidation process described above has started but not yet finalised, and where the fibers are weakly attached to each other giving the porous fibrous layer some stability for handling and reducing fiber loss during handling. The consolidation may be the finalised in a second step where the fibers are properly bonded during consolidation as described above.

Area weights, densities and thicknesses may be measured using standard methods known in the art.

Any range given should include the starting and end points as well as normal expected deviations in the measurements. Start and end point values of different ranges may be combined.

Further embodiments of the invention may be derived from the description also by combining the different embodiments and examples of the invention and may be also derived from the description of the embodiments shown in the figures. The figures are schematic pictures and are not necessarily in scale.

BRIEF DESCRIPTION OF DRAWINGS

FIG. 1 shows a schematic cross section of a three layer system (1) of a noise attenuating trim part according to the invention, showing varying area weight and thickness, according to the invention. The air permeable intermediate film layer (3) is situated in-between the first porous fibrous layer (2) and the second porous fibrous layer (4) and the three layer system is resting on a vehicle body (5) e.g. steel or aluminium sheet. The three layers 2, 3 and 4 are laminated together and resting on the car body. Six areas with different area weight and thickness are indicated by number 6, 7, 8, 9, 10 and 11.

FIG. 2 shows schematic picture of a three layer system, e.g. a carpet for a car (12), with area weight varying over the surface according to the invention, viewed from above, and example of area weight distribution over the surface of the second porous fibrous layer. Four different area weights are shown, 400 g·m$^{-2}$ (13), 550 g·m$^{-2}$ (14), 750 g·m$^{-2}$ (15) and 1100 g·m$^{-2}$ (16).

FIG. 3 shows a graph with the upper area weight limit (45*t+475) and lower area weight limit (25*t+175) according to the invention, where t is in mm and AW2 is in g·m$^{-2}$. FIG. 3 further shows the area weight-thickness relation variation of three configurations of the three layer system.

The upper and lower area weight limit can be used to identify a range of acoustically optimal area weights for the decoupler as function of the total thickness t of the three layer system. The acoustically optimal area weight may also be compared to other requirements, such as filling space capability and minimum density for compression stiffness requirement.

All three configurations have two porous fibrous layers with an intermediate air permeable film layer situated between the two fibrous layers. The air permeable film layer is the same for all three configurations and the film layer is about 20 micrometer thick. All three configurations have the same thickness distribution.

Configuration 1 is a three layer system according to the state of the art with a second layer (decoupling layer) with a uniform area weight over the surface of 700 g·m$^{-2}$ (grams per square meter). Uniform should be understood to be uniform within normal production variation which is about +/−10%.

The first layer of configuration 1 (top layer) is also with uniform area weight over the surface of 750 g·m$^{-2}$.

The AFR of configuration 1 is varying over the surface between 3500 and 5500 Ns/m$^3$.

Figure 1:
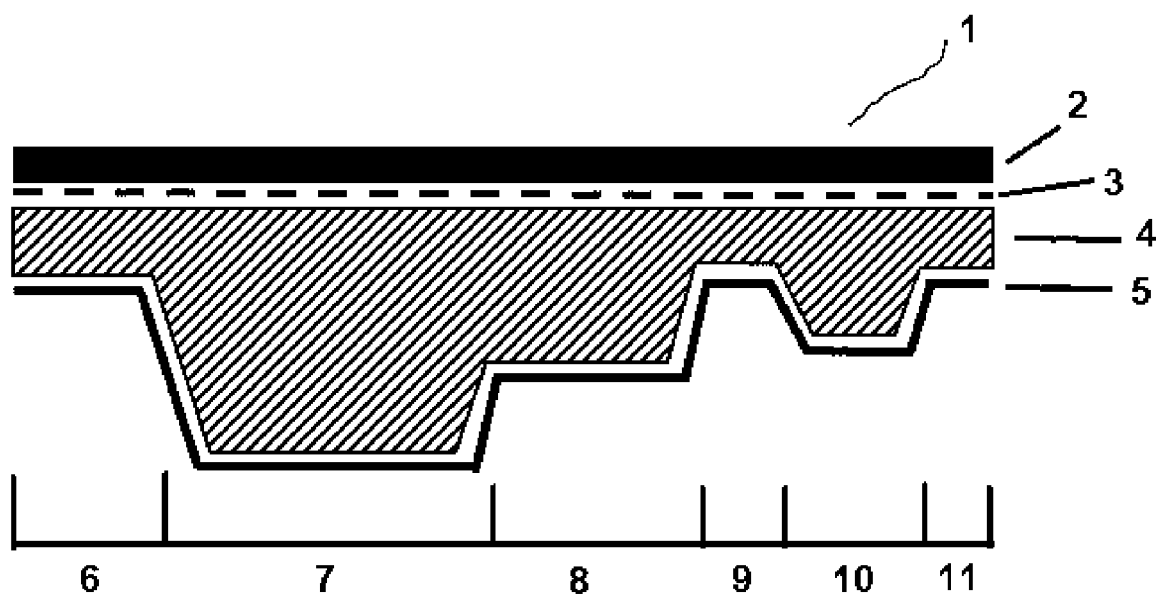
FIG. 1, schematic cross section of a three layer system of a noise attenuating trim part, showing varying area weight and thickness of the three layer system, according to the invention.
Figure 2:
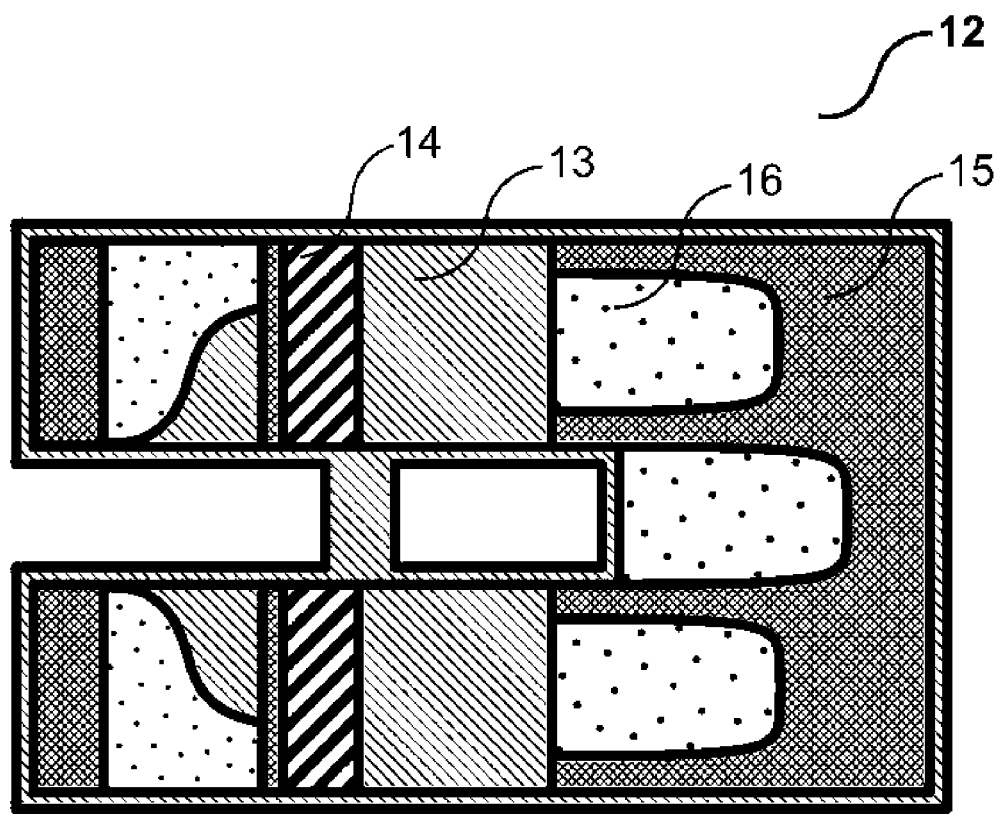
FIG. 2, schematic picture of a three layer system, e.g. a carpet for a car (12), with area weight varying over the surface according to the invention, viewed from above.
Figure 3:
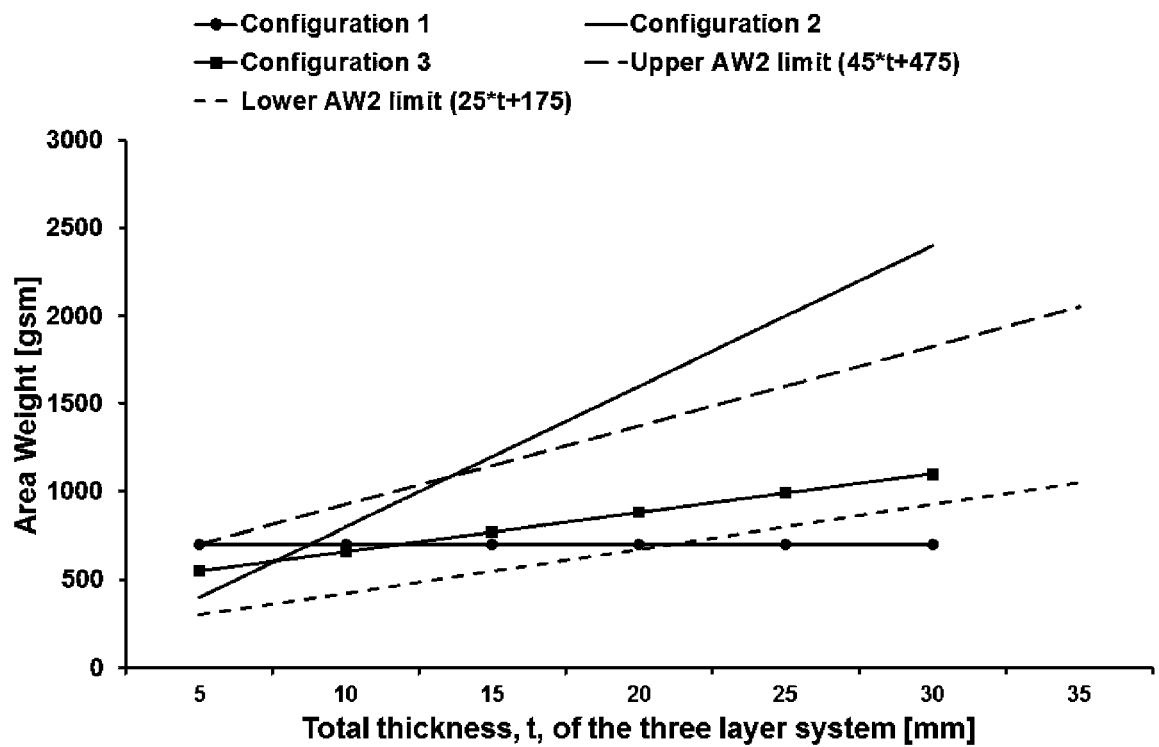
FIG. 3 shows a graph with the area weight upper and lower limits according to the invention as a function of the total thickness of the tree layer system as well as the area weight-thickness relation for three different configurations, configuration 3 being according to the invention.

Configuration 2 is a three layer system with a second layer (decoupling layer) with an area weight varying over the surface and varying with the total thickness of the three layers system as shown in the graph in FIG. 3, with the area weight above the upper limit defined by the invention, at least at higher thicknesses above 15 mm. The first porous fibrous layer (top layer) is with uniform area weight over the surface of 400 g·m$^{-2}$.

The AFR of configuration 2 is varying over the surface between 3500 and 5000 Ns/m$^3$.

Configuration 3 is a three layer system according to the invention with a second layer (decoupling layer) with an area weight varying over the surface and varying with the total thickness of the three layers system within the upper and lower limit according to the invention as shown in the graph in FIG. 3. The first layer (top layer) has a uniform area weight over the surface of 750 g·m$^{-2}$.

The AFR of configuration 3 is varying over the surface between 4000 and 6000 Ns/m$^3$.

The first fibrous layers (top layer) of all three configurations are varying between 2 and 8 mm.

All three configurations have the same total weight and the fiber mix of the first and second porous fibrous layer is the same and also the same for all three configurations. The fiber mix is about 15 to 30% PET/CoPET BICO fibers, about 30 to 40% hollow conjugate self-crimped frizzy fibers and about 40% shoddy cotton.

Figure 4:
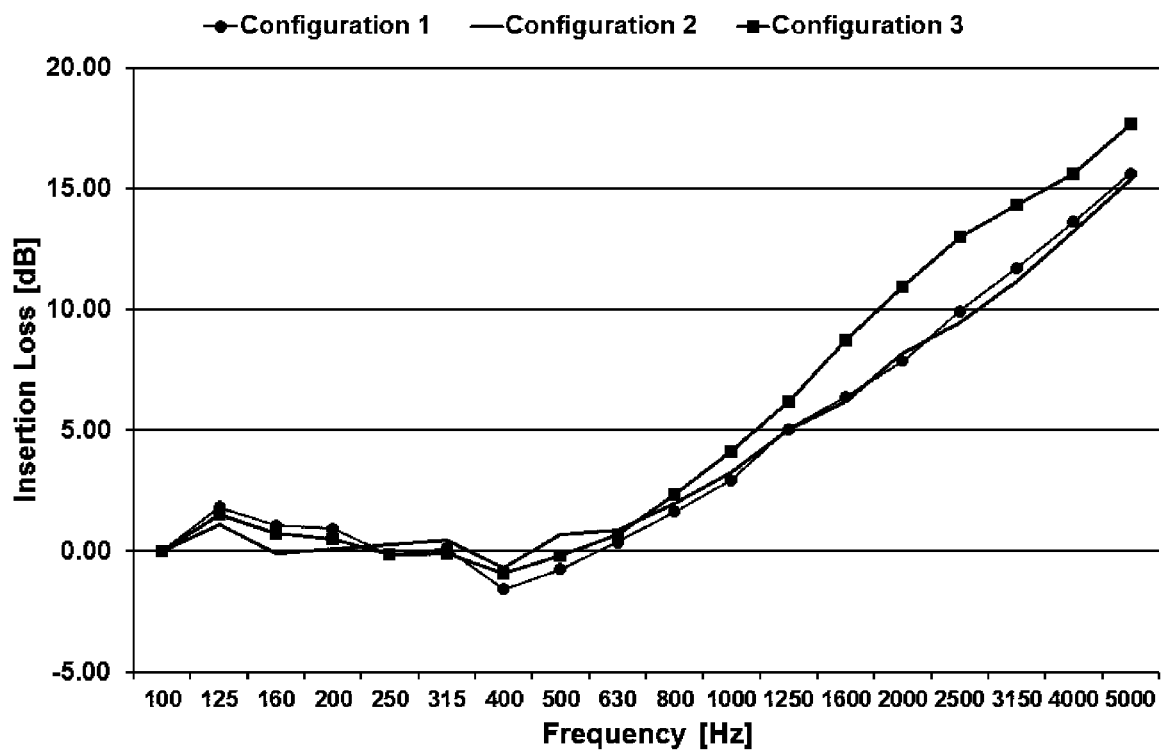
FIG. 4 shows estimated insertion loss of three configurations of three layer systems.

FIG. 4 shows estimated insertion loss of the three configurations shown in FIG. 3. Insertion loss of flat samples have been measured at different thicknesses and area weights with the, at Autoneum commercially available, device "Isokell".

The insulation performance of a noise attenuating trim part may be assessed by measuring the transmission loss (TL) of the trim part placed on a structure e.g. a steel panel. The transmission loss is defined as the ratio, TL=10 log$_{10}$ (Wi/Wt), expressed in decibels, of the acoustic power incident (Wi) on the structure and the acoustic power transmitted (Wt) by the structure to the receiving side. The inverse ratio, Wt/Wi, is the transmission coefficient.

Since it is important to evaluate the noise insulation capabilities of an automotive acoustical part independently from the steel structure on which it is mounted, the insertion loss is introduced. The insertion loss (IL) of an acoustical part placed on a structure, e.g. flat steel panel, is defined as the difference between the transmission loss of the structure equipped with the noise attenuating trim part (TL$_{part+steel}$) and the transmission loss of the structure alone (TL$_{steel}$):
IL$_{part}$=TL$_{part+steel}$−TL$_{steel}$ (dB).

The three configurations have the same thickness distribution being typical for such parts and the thickness distribution is as follows:

Thickness distribution below 7.5 mm 33%, with a thickness distribution between 7.5 and 12.5 mm 19%, with a thickness distribution between 12.5 and 17.5 mm 15%, with a thickness distribution between 17.5 and 22.5 mm 11%, with a thickness distribution between 22.5 and 27.5 mm 11%, and with a thickness distribution above 27.5 mm 11%.

Flat samples with thickness 5, 10, 15, 20 and 30 mm with area weights according to the three configurations were measured in the Isokell and the transmission coefficient for each area weight and thickness were estimated. For each of the three configurations, the transmission coefficient of the full part was estimated as a weighted average of the measured values of the transmission coefficient of the flat samples, where the weighting factors for the average are according to the area weight-thickness relation for each configuration and thickness distribution as disclosed above. From the averaged transmission coefficient for each configuration the transmission loss and insertion loss were calculated.

The insertion loss result is shown in FIG. 4 where, even though all three configurations have the same weight, configuration 3 according to the invention has a higher (better) insertion loss compared to the other two configurations.

Figure 5:
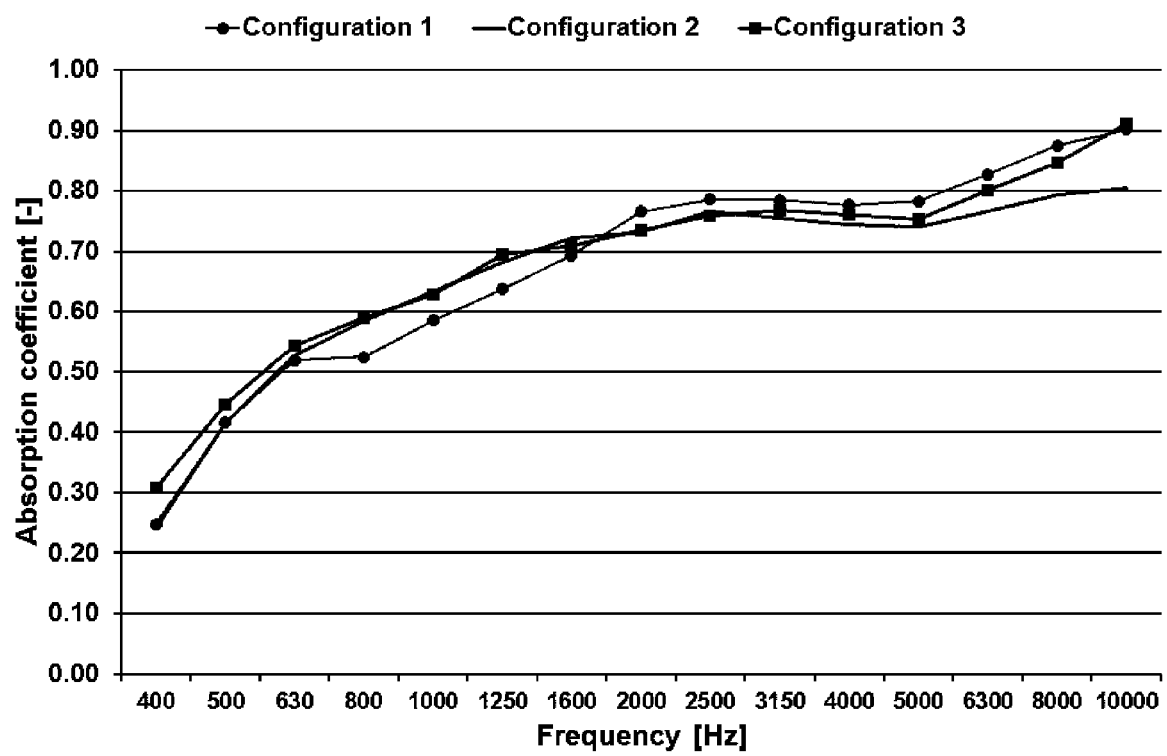
FIG. 5 shows estimated absorption coefficient of three configurations of three layer systems.

FIG. 5 shows absorption coefficient estimation of the same three configurations as described in FIGS. 3 and 4. Absorption coefficient of flat samples have been measured at different thicknesses and area weights in the, at Autoneum commercially available, device "Alpha Cabin".

Flat samples with thickness 5, 10, 15, 20 and 30 mm with area weights according to the three configurations were measured in the Alpha Cabin and the absorption coefficient for each area weight and thickness were estimated.

The Absorption coefficient for each configuration has been estimated according to the same principle described above, where for each configuration the measured absorption coefficient for the different area weight and thicknesses have been averaged according to the thickness distribution disclosed above in order to get the averaged absorption coefficient for each configuration. All three configurations show rather similar absorption performance, however since configuration 3 has a higher insertion loss, configuration 3 according to the invention is the preferred solution.

The invention claimed is:

1. A moulded three-dimensional noise attenuating trim part for a vehicle, comprising:
   a first porous fibrous layer;
   a second porous fibrous layer with a variable area weight (AW2)
   an air permeable intermediate film layer situated between and interconnected to the first and second porous fibrous layers;
   wherein the first porous fibrous layer, the second porous fibrous layer, and the air permeable intermediate film layer define a three-layer system having a total thickness (t) between 5 and 35 mm; and
   wherein the area weight (AW2) of the second porous fibrous layer varies with the total thickness (t) of the three-layer system within the limits provided by the following:
   25*t+175<AW2<45*t+475, wherein t is in mm and AW2 is in g·m$^{-2}$, and wherein the area weight AW2 of the second porous fibrous layer increases with increasing total thickness (t) of the three-layer system.

2. The moulded three-dimensional noise attenuating trim part according to claim 1, wherein each of the first and second porous fibrous layers have an area weight between 300 and 4000 g·m$^{-2}$.

3. The moulded three-dimensional noise attenuating trim part according to claim 1, wherein at least the second layer has a compression stiffness of at least 3.5 kPa.

4. Moulded three-dimensional noise attenuating trim part according to claim 1, wherein the total air flow resistance of the three-layer system is between 500 and 10000 Nsm$^{-3}$.

5. The moulded three-dimensional noise attenuating trim part according to claim 1, wherein the overall air flow resistance and the overall density $\bar{\rho}$ of the three-layer system relate as following:

$$1500 < AFR_{overall} - 10\,\bar{\rho} < 5000 \text{ with } AFR_{overall} \text{ in Nsm}^{-3} \text{ and } \bar{\rho} \text{ in kg/m}^3.$$

6. The moulded three-dimensional noise attenuating trim part according to claim 1, wherein the overall air flow resistance and the overall density $\bar{\rho}$ of areas of the three-layer system with overall density above 160 kg/m3 relate as follows:

$$1500 < AFR_{overall} - 10\,\bar{\rho} < 5000 \text{ with } AFR_{overall} \text{ in Nsm}^{-3} \text{ and } \bar{\rho} \text{ in kg/m}^3.$$

7. The moulded three-dimensional noise attenuating trim part according to claim 1, wherein the air flow resistance of the first porous fibrous layer and the intermediate film layer together represents at least 55% of the total air flow resistance of the three-layer system, and wherein the air flow resistance of the intermediate film layer is higher than the total air flow resistance of the first and second porous fibrous layers.

8. The moulded three-dimensional noise attenuating trim part according to claim 1, wherein the first and second porous fibrous layers comprise fibers made of at least one material selected from the group consisting of: nylon, polyester, polyolefin, or polyethylene, and mineral fibers.

9. The moulded three-dimensional noise attenuating trim part according to claim 1, wherein at least one of the first and second porous fibrous layers comprises self-crimped frizzy fibers.

10. The moulded three-dimensional noise attenuating trim part according to claim 1, wherein at least one of the first and second porous fibrous layers comprises reclaimed fibers made of at least one material selected from the group consisting of: cotton shoddy, synthetic shoddy, polyester shoddy, natural fiber shoddy and mixed synthetic fiber, and natural fiber shoddy.

11. The moulded three-dimensional noise attenuating trim part according to claim 1, wherein the first and second porous fibrous layers comprise thermoplastic binder material made of at least one of the materials selected from the group consisting of: polyester, polyolefin, polylactic acid and polyamide.

12. The moulded three-dimensional noise attenuating trim part according to claim 1, wherein the air permeable intermediate film layer comprises at least one layer comprising at least one of the polymers selected from the group consisting of: polyester, polyamide, polyolefin, ethylene acrylic acid copolymers (EAA), polypropylene (PP), thermoplastic elastomers (TPEs), thermoplastic polyurethane (TPU), polyetherimide, polysulfone, polyethersulfone, polyetheretherketone, and copolymers, or biopolymers.

13. The moulded three-dimensional noise attenuating trim part according to claim 1, further comprising at least a covering scrim layer, an acoustic scrim layer, and a decorative top layer.

14. An inner-dash insulator or a floor carpet at least partially comprised of the moulded three-dimensional noise attenuating trim part of claim 1.

15. A method for producing the moulded three-dimensional noise attenuating trim part according to claim 1, comprising the steps of:
 a. preparing at least an unconsolidated or pre-consolidated second porous fibrous layer with an area weight varying over the surface, wherein the layer is produced by laying fibers and binder material into a product shaping cavity;
 b. preparing an unconsolidated or pre-consolidated first porous fibrous layer;
 c. stacking a film layer and the unconsolidated or pre-consolidated first and second porous fibrous layers in a mould with the film layer situated between the first and second porous fibrous layers, together with any optional additional layer; and
 d. consolidating the materials and laminating the layers together in the mould by a consolidating treatment, wherein the thermoplastic binder softens and or melts binding the fibers or binding to the adjacent layers.

* * * * *